United States Patent

[11] 3,582,904

[72] Inventor Rowland Bradwein
Newtown, Conn.
[21] Appl. No. 802,896
[22] Filed Feb. 27, 1969
[45] Patented June 1, 1971
[73] Assignee Sine Qua Non, Inc.
Newton, Conn.

[54] PORTABLE DATA TERMINAL
10 Claims, 1 Drawing Fig.

[52] U.S. Cl. .......... 340/172.5
[51] Int. Cl. .......... G06f 3/00, G06f 3/04, G06f 3/10
[50] Field of Search .......... 340/172.5; 235/157; 178/17

[56] References Cited

UNITED STATES PATENTS

| | | | |
|---|---|---|---|
| 3,275,995 | 9/1966 | Hagopian | 340/172.5 |
| 3,281,789 | 10/1966 | Willcox et al. | 340/172.5 |
| 3,296,370 | 1/1967 | Clark et al. | 178/17 |
| 3,307,147 | 2/1967 | Goldman et al. | 340/172.5 |
| 3,351,919 | 11/1967 | Milford | 340/172.5 |
| 3,400,378 | 9/1968 | Smith et al. | 340/172.5 |
| 3,434,117 | 3/1969 | Gibson et al. | 340/172.5 |
| 3,425,421 | 3/1969 | Sharples | 340/172.5 |

*Primary Examiner*—Gareth D. Shaw
*Attorney*—Pennie, Edmonds, Morton, Taylor and Adams

ABSTRACT: A data terminal comprising readily portable components is adapted to be interconnected by voice grade telephone lines to a remotely located computer or other data processing equipment. The data terminal comprises data input means (e.g., a magnetic tape reader or a manually operated keyboard) for generating a coded digital signal, a data set for converting the digital signal of the data input means to a coded modulated signal that can be transmitted over a telephone line and for converting a modulated signal received from said telephone line into a coded digital signal, and translator means for converting digital signals received from the data input means and from the data set into coded electrical signals capable of operating a data printout device (e.g., a paper tape printer or an electric typewriter).

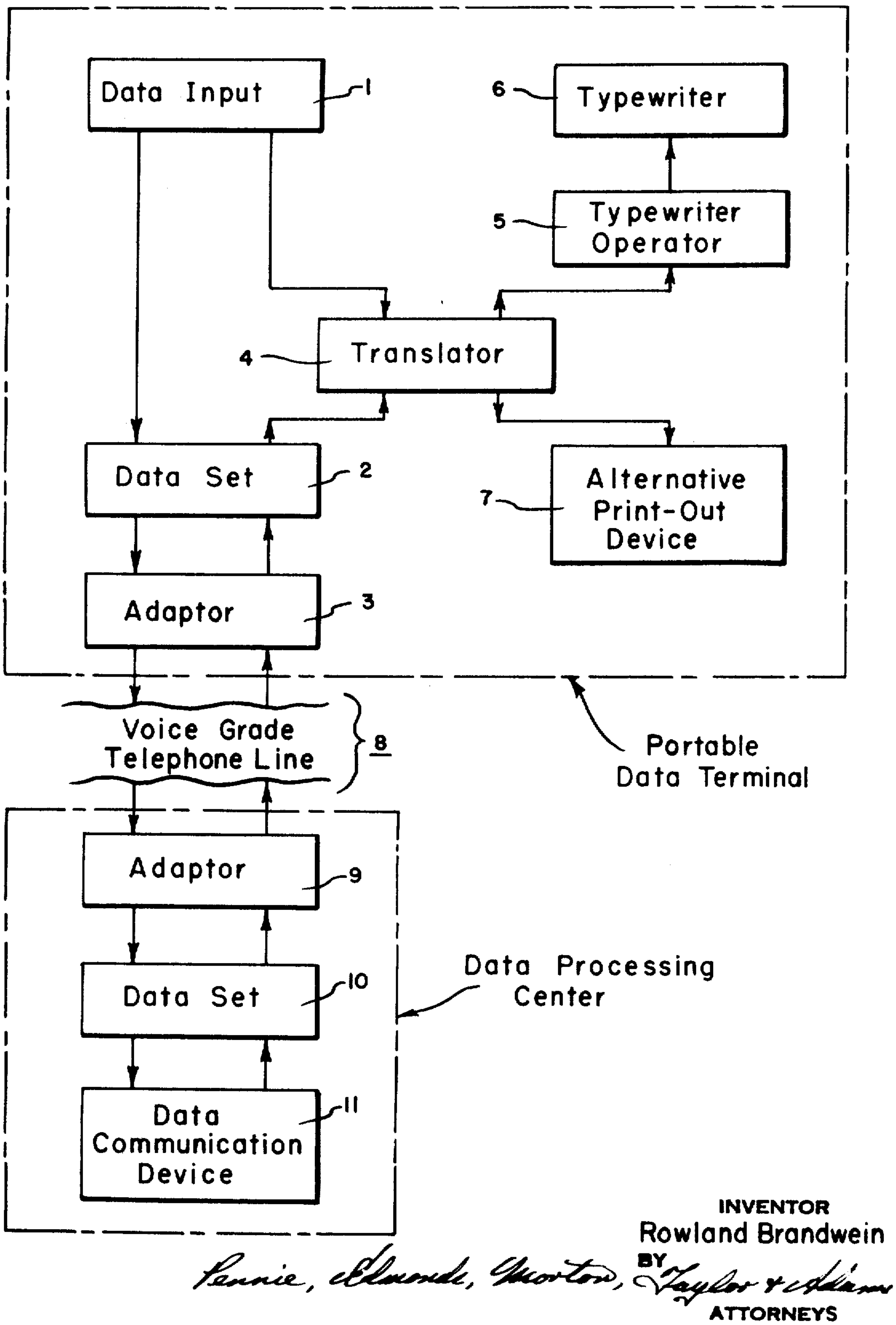
INVENTOR
Rowland Brandwein
BY Pennie, Edmonds, Morton, Taylor & Adams
ATTORNEYS

PORTABLE DATA TERMINAL

BACKGROUND OF THE INVENTION

1. Field of the Invention

This invention relates to data terminals for computers and other data processing equipment.

2. Prior Art

Large commercial computers are ordinarily permanently installed in specially designed and equipped data processing centers. Such computers are connected by appropriate electrical wiring to one or more data terminals that are designed to feed data to the computer for processing in accordance with the computer program and to receive the processed data output of the computer and to print the processed data or otherwise present it in a form suitable for use by the operator. A typical data terminal comprises data input means, data input/computer interface means, and precessed data printout means. The data input means may comprise a magnetic tape reader, a perforated tape reader, a manually operated data input keyboard, or equivalent equipment, and the data printout means may comprise a magnetic tape recorder, a paper tape perforator, a typewriter or equivalent equipment. The data terminal is normally located near the computer at the data processing center, although it can be located at a remote location and be connected to the computer by means of permanently installed communication lines. In any case, the data terminal is itself a relatively permanent installation to which persons who wish to use the computer must travel.

There exists a need for a portable data terminal that can be transported from place to place as required and, after being set up for operation, be connected to a remotely located computer by the necessary communication lines. The development of such portable data terminals has been hindered by the fact that conventional data input and data printout devices are inherently bulky and lacking in portability and also by the requirement that the data terminal and the computer be interconnected by more or less permanently installed communication lines.

SUMMARY OF THE INVENTION

After an intensive investigation of the requirements for a practical portable data terminal system, I have devised a data terminal that comprises a compact, readily portable unit consisting of several functional components. The data terminal of my invention makes use of voice grade telephone lines to interconnect the data terminal with a remotely located data processing center, and in its preferred embodiment it makes use of a conventional electric typewriter that is found in most business offices as the data printout means. The data terminal of my invention comprises data input means adapted to generate a coded digital signal containing the data introduced into the data input means, a data set connected to the data input means for converting the coded digital signal to a modulated signal capable of being transmitted over a voice grade telephone line and for converting a modulated signal received from the same telephone line to a coded digital signal. Adapter means connect the data set to the telephone line, and a data printout device is connected to the data input means and to the data set for making a permanent record of the data input and output. The modulated signal transmitted over the voice grade telephone line is received at the data processing center where it is converted to a digital signal by a data set at the center, the digital signal then being fed to a data communication device, for example, a computer, for processing in accordance with the computer program. Processed data from the data communication device is transmitted via the voice grade telephone line back to the data terminal where this data is printed or otherwise presented by the data printout device in a form that can be read or made use of by the operator of the data terminal.

BRIEF DESCRIPTION OF THE DRAWING

The data terminal of my invention, and its relationship to a data communication device permanently installed at a data processing center, will be better understood from the following detailed description in conjunction with the single figure of the accompanying drawing which shows, in schematic form, the arrangement of functional components comprising an advantageous embodiment of my new data processing system.

DETAILED DESCRIPTION

In the advantageous embodiment of my invention shown in the drawing, the portable data terminal comprises as data input means 1 capable of generating a coded digital signal, a data set 2 for converting the coded digital signal from the data input means to a modulated signal that can be transmitted over a voice grade telephone line, an adapter 3 connecting the data set to the telephone line, and a code converter or translator 4 for converting the digital signal received from the data input means 1 and from the data set 2 to coded electrical impulses which are capable of operating a data printout device. As shown in the drawing, the data printout device may comprise a typewriter operator means 5 adapted to operate the keyboard of a conventional electric typewriter and an electric typewriter 6 that is operated by the typewriter operator 5. Alternatively, the data printout device may comprise, for example, a paper tape perforator or a magnetic tape recorder (designated as alternative printout devices 7 in the drawing) in which case the translator 4 is adapted to convert the digital signal received from the data input device 1 or the data set 2 into coded signals which will operate the tape perforate or tape recorder.

In the preferred embodiment of my portable data terminal the data input means 1 comprises a manually operated keyboard which generates a coded digital signal (e.g., in 8-bit parallel ASCII code) when the keys of the keyboard are depressed by the operator. Typical keyboard data input devices are disclosed in U.S. Pat. Nos. 3,249,199 to Jones, 3,275,995 to Hagopian and 3,296,370 to Clark and Stefanik. A commercially available keyboard data input means particularly suitable for use in my data terminal is the Model KB-200 keyboard manufactured by Connecticut Technical Corporation. Alternately, the data input means 1 can be a conventional magnetic tape reader which reads the digital code magnetically imprinted on a magnetic tape, or a conventional perforated tape reader which similarly reads the data encoded in perforated paper tape. The data output means 1 can also be a computer which generates a digital output signal as data fed into the computer is processed in accordance with the computer's program. However, it is obvious that if a computer is employed as the data input device, the portability of my data terminal becomes contingent upon the portability of the computer itself. In any case, the coded digital signal generated by the data input means is fed to the data set 2 and to the translator 4.

The data set 2 is a modulation/demodulator device that is adapted to convert the coded digital signal generated by the data input means 1 into a coded modulated signal that can be carried by a voice grade telephone line. Modulator/demodulator devices are disclosed in U.S. Pat. No. 3,275,995 to Hagopian. Data sets useful in the practice of my invention are of two general types. In the first of these types the digital signal from the data input device 1 is converted to an acoustic signal or modulated tone in the acoustic frequency range. Such data sets are provided with an acoustic coupler (the adapter 3) so that the modulated signal can be transmitted over the voice grade telephone line in the manner audible tones are normally transmitted by a telephone instrument. Acoustic couplers (the transducers 20, 30 and 80) are disclosed in U.S. Pat. No. 3,307,147 to Goldman and Katz. A commercially available combination of data set and acoustic adapter comprises the Model 1067 data set and Model 1058C acoustic coupler manufactured by Tuck Electronics. The other general type of data set useful in the practice of my invention comprises digital-analog code converters which are provided with a filter net connector (the adapter 3) which directly connects the output of the data set to the telephone line. Such a combination of data set and filter net adapter (the data set 24) is disclosed in U.S. Pat. No. 3,351,919 to Milford. A commercially available combination of digital-analog data set and filter net adapter comprises the Model 1067 data set and Model 1033-—35 line adapter also manufactured by Tuck Electronics. The data set 2 (in conjunction with its associated adapter 3) also converts modulated signals received via the voice grade telephone line to coded digital signals that are fed to the code converter or translator 4.

The code converter or translator 4 is adapted to convert a coded digital signal received from the data input means 1 or the data set 2 into coded electrical impulses or signals which are capable of operating a data printout device. A code converter or translator of the type referred to is disclosed in U.S. Pat. No. 3,351,919 to Milford (the so-called data processing devices 20 of the Milford U.S. patent). The character of the coded electrical signal generated by the translator 4 depends on the type of printout device employed in a given data terminal. For example, the printout device may comprise a conventional electric typewriter, a magnetic tape recorder, a paper tape perforator or any equivalent device which presents data in a form usable by the operator of the data terminal. When the data printout device is an electric typewriter, the translator 4 converts the coded digital signal received by it into discrete electrical impulses which operate the keyboard operating mechanism of a typewriter operator. When the printout device is a magnetic tape recorder, the translator 4 converts the digital signal received by it into a coded signal that will operate a tape recorder and magnetically print the encoded data on a magnetic tape. Similarly, when the data printout device is a paper tape perforator, the translator 4 converts the coded digital signal received by it into a coded signal that operates the tape perforator and forms the desired perforations in a tape in Teletype, IBM, Friden, or such other codes as may be required by the operator. Translators capable of converting digital signals from one code to another are well known in the art and are available through commercial suppliers.

As previously mentioned, in the preferred embodiment of my invention the data printout device comprises a conventional electric typewriter 6 such as is found in most business offices, the typewriter being operated by a typewriter operator 5 that is connected to and is actuated by the translator 4. The typewriter operator 5 comprises a unit that is positioned directly over the keyboard of the electric typewriter 6, the operator 5 being provided with a plurality of plungers which are individually actuated to depress the typewriter key disposed directly underneath each plunger. A typewriter operator and an electric typewriter of the type described are disclosed in U.S. Pat. No. 3,249,199 to Jones. The plungers of the typewriter operator can be actuated by individual electric solenoids or by hydraulic or pneumatic devices. A commercially available combination of typewriter operator 5 and electric typewriter 6 useful in the practice of my invention comprises the Model SP-200 operating unit manufactured by Connecticut Technical Corporation and a Model 721 Selectric typewriter manufactured by International Business Machines. Alternatively, the printout device can comprise a conventional tape recorder, a paper tape perforator or an equivalent device of the type previously described, these alternate printout devices being designated as alternative printout devices 7 in the schematic drawing.

Data introduced into the data terminal by the data input means 1 is transmitted in the form of a coded modulated signal over a voice grade telephone line 8 to a remotely located data processing center. The data processing center is equipped with an adapter 9, such as the transducer 20 disclosed in U.S. Pat. No. 3,307,147, a data set 10 of the type hereinbefore described and a data communication device 11. The data communication device 11 may be any device that is designed to receive and to transmit data in the form of (or contained in) a coded digital signal. Such devices include, but are not limited to, computers, teletypewriters, magnetic tape recorders and readers, and the like. When the data communication device is a computer (as is usually the case) the modulated signal received at the data processing center is converted to a computer-compatible coded digital signal by the combination of adapter 9 and data set 10 which are essentially functionally equivalent to the data set 2 and adapter 3 of my portable data terminal. The coded digital signal from the data set 10 is fed to the computer 11 where the data is processed in accordance with the computer program. Similarly, when the data communication device 11 is a teletypewriter or a magnetic tape recorder and reader or the like, the data set 10 converts the modulated signal received via the telephone line 8 into a coded digital signal that is compatible with the particular data communication device being employed. In all cases processed data is then fed back through the data set 10 and adapter 9 to the voice grade telephone line 8 by means of which line the processed data is transmitted to the portable data terminal. The modulated signal containing the processed data is reconverted to a coded digital signal by the data set 2, the coded digital signal being fed to the translator 4 and thence to the data printout device of the data terminal in the manner previously described.

The components of my portable data terminal comprising the data input means 1, the data set 2 with its associated adapter 3, the translator 4 and (if applicable) the typewriter operator 5 are each relatively small units and are readily transported from one location to another. Moreover, several of the various functions represented the drawing as being performed by separate components can, in practice, be combined in one component or unit. Thus, the data set 2 and adapter 3 are conveniently combined to form a single structural component of the terminal. Moreover, in certain specific applications, the translator 4 can also be combined with the data set 2 to form a single structural unit of enhanced portability. The electric typewriter, the magnetic tape recorder or the paper tape perforator employed as the printout device is normally to be found at the location at which the data terminal is being set up and used. If not available at the proposed data terminal site, the required printout device can readily be brought to the site along with the other components of the portable data terminal. In any case, the various components of the data terminal can normally be packaged for transport from one site to another in a suitable container of less than 2 cubic feet in volume.

It is apparent from the foregoing description of my portable data terminal that the components of the terminal comprise a few compact units which can be easily moved from one location to another as required by the needs of the operator. As the necessary communication connection between the data terminal and the remote data processing center is made by means of voice grade telephone lines, the need for specially installed communication lines is avoided. Moreover, in the preferred embodiment the printout device comprises a standard electric typewriter which is usually to be found in any location where the data terminal is to be set up, thereby obviating the need to carry this piece of eqUipment from place to place. As a result, almost any business office can be used as the site for my data terminal, and the data terminal can easily and quickly be set up for operation at this site without the need for special communication lines and other costly installation structures.

I claim:

1. A data terminal adapted to be interconnected with a remote data processing center by voice grade telephone lines, said data terminal comprising data input means adapted to generate a coded digital signal containing the data introduced into said input device, a data set connected to the data input means for converting said coded digital signal to a modulated signal capable of being transmitted over a voice grade telephone line and for converting a modulated signal received from said telephone line to a coded digital signal, said data set having adapter means for connecting the data set to said telephone line, translator means connected to the data input means and to the data set for converting coded digital signals received from said data input means and from said data set into coded electrical signals capable of operating a data printout device, and a data printout device connected to said translator means for printing coded digital signals received from data input means and from said data set.

2. The data terminal according to claim 1 in which the data input means comprises a manually operated keyboard that generates said coded digital signal when the keys of said keyboard are depressed.

3. The data terminal according to claim 1 in which the data input means is a magnet tape reader.

4. The data terminal according to claim 1 which the data input means is a perforated paper tape reader.

5. The data terminal according to claim 1 in which the data input means is a computer.

6. The data terminal according to claim 1 in which the data set converts the coded signal received from the data input means into a modulated acoustic frequency signal, and in which the adapter means is an acoustic coupler.

7. The data terminal according to claim 1 in which the data set converts the coded digital signal received from the data input means into coded analog signal containing the encoded data and in which the adapter means is a filter net telephone line connecter.

8. The data terminal according to claim 1 in which the data printout device is a typewriter operator means and a typewriter.

9. The data terminal according to claim 1 in which the data printout device is a magnetic tape recorder.

10. The data terminal according to claim 1 in which the data printout device is a paper tape perforator.

PO-1050
(5/69)

UNITED STATES PATENT OFFICE
CERTIFICATE OF CORRECTION

Patent No. 3,582,904 Dated June 1, 1971

Inventor(s) Rowland Brandwein

It is certified that error appears in the above-identified patent and that said Letters Patent are hereby corrected as shown below:

On the title page, the inventor's name, Item 72, should read as follows: Rowland Brandwein;

On the same page, Item 56 should show that the correct number for the Sharples patent should read 3,435,421.

Column 2, line 33, "perforate" should read --perforator--.

Column 2, line 48, "output", should read --input--.

Column 2, line 58, "modulation" should read --modulator--.

Column 4, line 62, "eqUipment" should read --equipment--.

Columns 5 and 6, cancel claims 2 - 10 and insert the following:

Claim 2. A data terminal adapted to be interconnected with a remote data processing center by voice grade telephone lines, said data terminal comprising data input means adapted to generate a coded digital signal containing the data introduced into said input device, said data input means comprising a manually operated keyboard that generates said coded digital signal when the keys of said keyboard are depressed, a data set connected to the data input means for converting said coded digital signal to a modulated signal capable of being transmitted over a voice grade telephone line and for converting a modulated signal received from said telephone line to a coded digital signal, said data set having adaptor means for connecting the data set to said telephone line, translator means connected to the data input means and to the data set for converting coded digital signals received from said data input means and

PO-1050
(5/69)

UNITED STATES PATENT OFFICE
CERTIFICATE OF CORRECTION

Patent No. 3,582,904 Dated June 1, 1971

Inventor(s) Rowland Brandwein PAGE -2

It is certified that error appears in the above-identified patent and that said Letters Patent are hereby corrected as shown below:

from said data set into coded electrical signals capable of operating a data print-out device, and a data print-out device connected to said translator means for printing coded digital signals received from said data input means and from said data set.

Claim 3. A data terminal adapted to be interconnected with a remote data processing center by voice grade telephone lines, said data terminal comprising data input means adapted to generate a coded digital signal containing the data introduced into said input device, said data input means comprising a magnetic tape reader, a data set connected to the data input means for converting said coded digital signal to a modulated signal capable of being transmitted over a voice grade telephone line and for converting a modulated signal received from said telephone line to a coded digital signal, said data set having adaptor means for connecting the data set to said telephone line, translator means connected to the data input means and to the data set for converting coded digital signals received from said data input means and from said data set into coded electrical signals capable of operating a data print-out device, and a data print-out device connected to said translator means for printing coded digital signals received from said data input means and from said data set.

Claim 4. A data terminal adapted to be interconnected with a remote data processing center by voice grade telephone lines, said data terminal comprising data input means adapted to generate a coded digital signal containing the data introduced into said input device, said data input means comprising a perforated paper tape reader, a data set connected to the data

PO-1050
(5/69)

UNITED STATES PATENT OFFICE
CERTIFICATE OF CORRECTION

Patent No. 3,582,904 Dated June 1, 1971

Inventor(s) Rowland Brandwein

It is certified that error appears in the above-identified patent and that said Letters Patent are hereby corrected as shown below:

input means for converting said coded digital signal to a modulated signal capable of being transmitted over a voice grade telephone line and for converting a modulated signal received from said telephone line to a coded digital signal, said data set having adaptor means for connecting the data set to said telephone line, translator means connected to the data input means and to the data set for converting coded digital signals received from said data input means and from said data set into coded electrical signals capable of operating a data print-out device, and a data print-out device connected to said translator means for printing coded digital signals received from said data input means and from said data set.

Claim 5. A data terminal adapted to be interconnected with a remote data processing center by voice grade telephone lines, said data terminal comprising data input means adapted to generate a coded digital signal containing the data introduced into said input device, said data input means comprising a computer, a data set connected to the data input means for converting said coded digital signal to a modulated signal capable of being transmitted over a voice grade telephone line and for converting a modulated signal received from said telephone line to a coded digital signal, said data set having adaptor means for connecting the data set to said telephone line, translator means connected to the data input means and to the data set for converting coded digital signals received from said data input means and from said data set into coded electrical signals capable of operating a data print-out device, and a data print-out device connected to said translator means for printing coded digital signals received from said data input means and from said data set.

PO-1050
(5/69)

UNITED STATES PATENT OFFICE
CERTIFICATE OF CORRECTION

Patent No. 3,582,904 Dated June 1, 1971

Inventor(s) Rowland Brandwein PAGE - 4

It is certified that error appears in the above-identified patent and that said Letters Patent are hereby corrected as shown below:

Claim 6. A data terminal adapted to be interconnected with a remote data processing center by voice grade telephone lines, said data terminal comprising data input means adapted to generate a coded digital signal containing the data introduced into said input device, a data set connected to the data input means for converting said coded digital signal to a modulated acoustic frequency signal capable of being transmitted over a voice grade telephone line and for converting a modulated acoustic frequency signal received from said telephone line to a coded digital signal, said data set having an acoustic coupler for acoustically connecting the data set to said telephone line, translator means connected to the data input means and to the data set for converting coded digital signals received from said data input means and from said data set into coded electrical signals capable of operating a data print-out device, and a data print-out device connected to said translator means for printing coded digital signals received from said data input means and from said data set.

Claim 7. A data terminal adapted to be interconnected with a remote data processing center by voice grade telephone lines, said data terminal comprising data input means adapted to generate a coded digital signal containing the data introduced into said input device, a data set connected to the data input means for converting said coded digital signal to a coded analog signal capable of being transmitted over a voice grade telephone line and for converting a coded analog signal received from said telephone line to a coded digital signal, said data set having a filter net telephone line connector for connecting the data set to said telephone line, translator means connected to the data input means and to the data set for

PO-1050
(5/69)

UNITED STATES PATENT OFFICE
CERTIFICATE OF CORRECTION

Patent No. 3,582,904 Dated June 1, 1971

Inventor(s) Rowland Brandwein PAGE - 5

It is certified that error appears in the above-identified patent and that said Letters Patent are hereby corrected as shown below:

converting coded digital signals received from said data input means and from said data set into coded electrical signals capable of operating a data print-out device, and a data print-out device connected to said translator means for printing coded digital signals received from said data input means and from said data set.

Claim 8. A data terminal adapted to be interconnected with a remote data processing center by voice grade telephone lines, said data terminal comprising data input means adapted to generate a coded digital signal containing the data introduced into said input device, a data set connected to the data input means for converting said coded digital signal to a modulated signal capable of being transmitted over a voice grade telephone line and for converting a modulated signal received from said telephone line to a coded digital signal, said data set having adaptor means for connecting the data set to said telephone line, translator means connected to the data input means and to the data set for converting coded digital signals received from said data input means and from said data set into coded electrical signals capable of operating a data print-out device, and a data print-out device connected to said translator means for printing coded digital signals received from said data input means and from said data set, said data print-out device comprising a typewriter operator means and a typewriter.

Claim 9. A data terminal adapted to be interconnected with a remote data processing center by voice grade telephone lines, said data terminal comprising data input means adapted to generate a coded digital signal containing the data introduced into said input device, a data set connected to the data input means for converting said

PO-1050
(5/69)

UNITED STATES PATENT OFFICE
CERTIFICATE OF CORRECTION

Patent No. 3,582,904 Dated June 1, 1971

Inventor(s) Rowland Brandwein PAGE - 6

It is certified that error appears in the above-identified patent and that said Letters Patent are hereby corrected as shown below:

coded digital signal to a modulated signal capable of being transmitted over a voice grade telephone line and for converting a modulated signal received from said telephone line to a coded digital signal, said data set having adaptor means for connecting the data set to said telephone line, translator means connected to the data input means and to the data set for converting coded digital signals received from said data input means and from said data set into coded electrical signals capable of operating a data print-out device, and a data print-out device connected to said translator means for printing coded digital signals received from said data input means and from said data set, said data print-out device comprising a magnetic tape recorder.

Claim 10. A data terminal adapted to be interconnected with a remote data processing center by voice grade telephone lines, said data terminal comprising data input means adapted to generate a coded digital signal containing the data introduced into said input device, a data set connected to the data input means for converting said coded digital signal to a modulated signal capable of being transmitted over a voice grade telephone line and for converting a modulated signal received from said telephone line to a coded digital signal, said data set having adaptor means for connecting the data set to said telephone line, translator means connected to the data input means and to the data set for converting coded digital signals received from said data input means and from said data set into coded electrical signals capable of operating a data print-out device, and a data print-out device connected to said translator means for printing coded digital signals received from said data input means and from said data set, said data print-out device comprising a paper tape perforator.

Signed and sealed this 7th day of December 1971.

(SEAL)
Attest:

EDWARD M.FLETCHER,JR.
Attesting Officer

ROBERT GOTTSCHALK
Acting Commissioner of Patents